April 9, 1957  H. L. BLOOD ET AL  2,787,874
ELECTRO-MAGNETIC CHUCK
Filed March 29, 1955  3 Sheets-Sheet 2
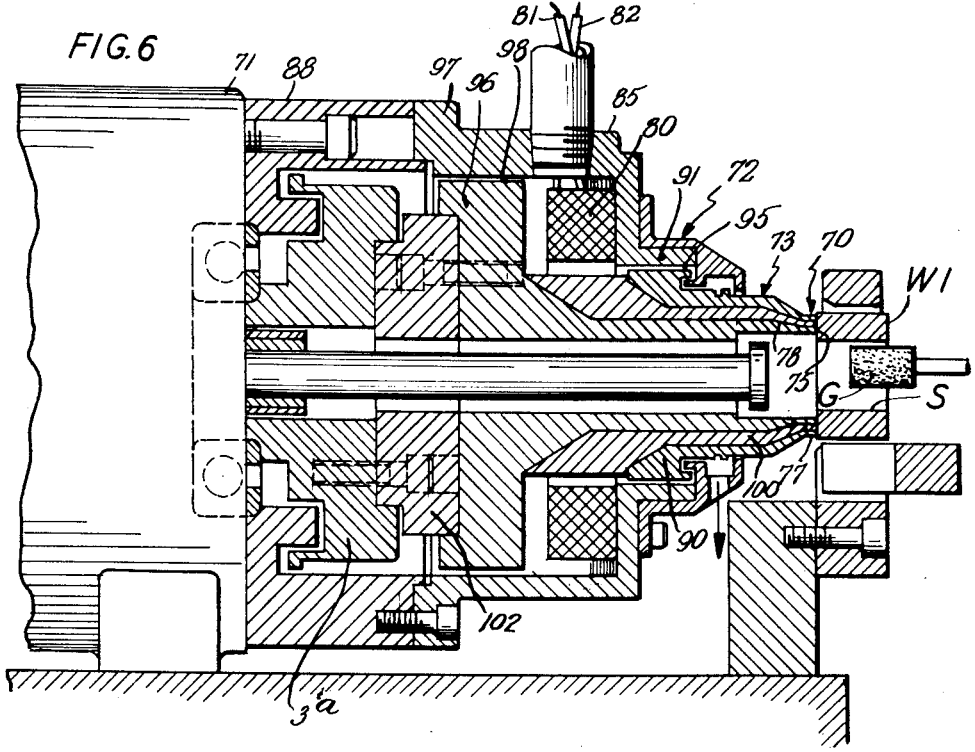
FIG.6
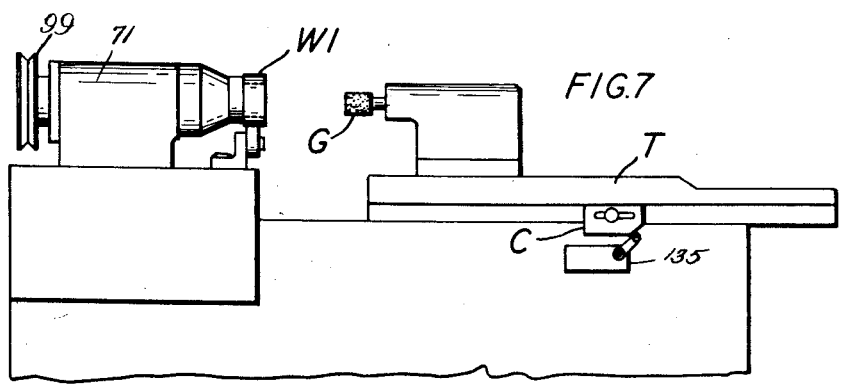
FIG.7
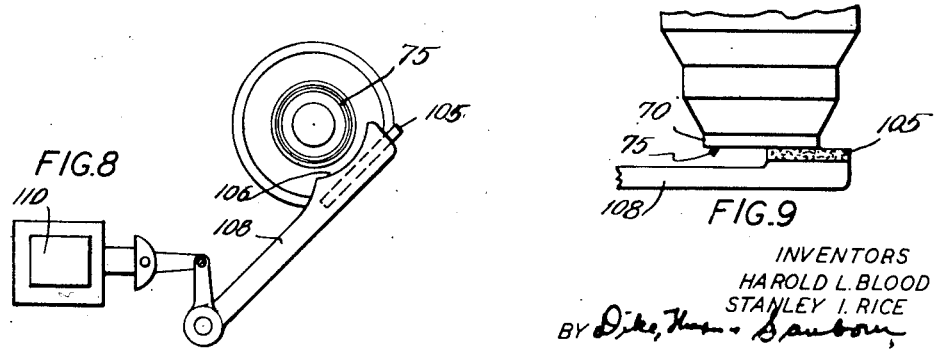
FIG.8
FIG.9
INVENTORS
HAROLD L. BLOOD
STANLEY I. RICE
BY Dike, Thompson & Sanborn
ATTYS.

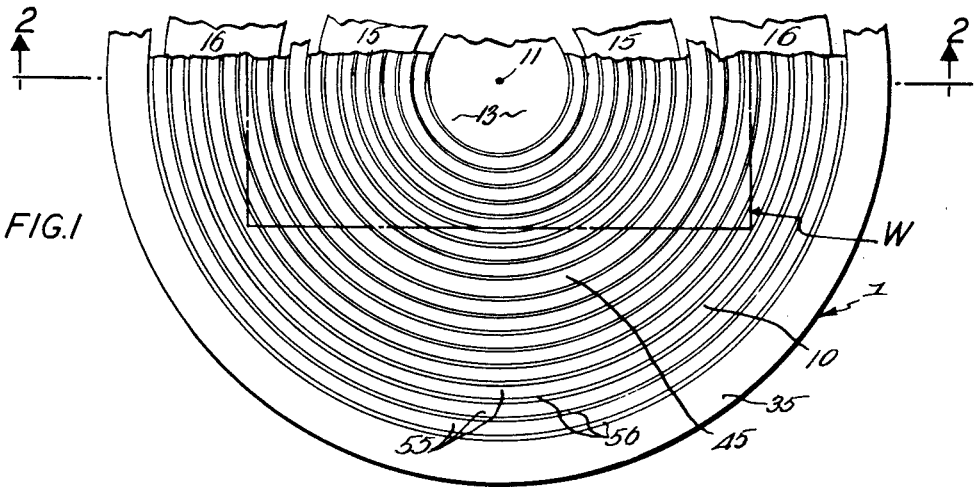
FIG.1
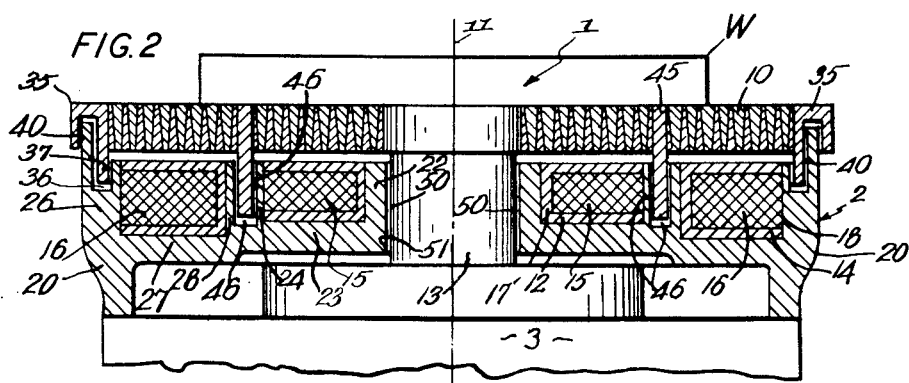
FIG.2
FIG.3
FIG.4
FIG.5
INVENTORS
HAROLD L. BLOOD
STANLEY J. RICE
BY Dike, Thompson Sanborn
ATTYS.

April 9, 1957     H. L. BLOOD ET AL     2,787,874
ELECTRO-MAGNETIC CHUCK

Filed March 29, 1955     3 Sheets-Sheet 3

INVENTORS
HAROLD L. BLOOD
STANLEY I. RICE
BY Dike, Fry, Sanborn
ATT'YS.

United States Patent Office 2,787,874
Patented Apr. 9, 1957

2,787,874

ELECTRO-MAGNETIC CHUCK

Harold L. Blood and Stanley I. Rice, Worcester, Mass., assignors, by mesne assignments, to The Heald Machine Company, a corporation of Delaware Application March 29, 1955, Serial No. 497,692

17 Claims. (Cl. 51—236)

This invention relates to rotary magnetic chucks and backplates of the electro-magnetic type.

The usual rotary electro-magnetic chuck for rotating a workpiece on a fixed center while a machining operation is being performed on it, for instance, as in a rotary surface grinder or an external or internal grinding machine, has a rotating coil which magnetizes a rotating core to hold the workpiece against the operating face of the chuck. Electric current is supplied to energize the coil through slip rings which rotate with the coil, thus involving sliding contacts.

A great disadvantage of such chucks is the fact that dirt and liquid coolant frequently work in between the slip rings and contacts and break the electric circuit to the coil, causing the chuck to be at least partially demagnetized so that it loses its grip upon the workpiece and allows it to move. Even a momentary interruption or reduction of the current flow of the order of a fraction of a second may allow movement of the workpiece of a thousandth of an inch, more or less, which may be sufficient to spoil the workpiece.

Our invention overcomes the above disadvantage by providing a rotary electro-magnetic chuck having one or more magnetizing coils which remain stationary, thus eliminating slip rings and sliding contacts and providing direct unbreakable contact for the current flow to the coil.

The following description and the drawings describe and show two chucks of the invention designed for specific needs, one being a chuck for a rotary surface grinder and another being a chuck for an internal grinding machine, these being illustrative of many possible adaptations of the invention.

In the drawings,

Fig. 1 is a fragmentary plan view showing the work-engaging face of the chuck for a rotary surface grinder;

Fig. 2 is a vertical section through the axis of the chuck taken along the line 2—2 of Fig. 1;

Fig. 3 is a partial enlargement of Fig. 2;

Fig. 4 is a top plan view of one of the coils shown in Fig. 2;

Fig. 5 is a vertical section taken along the lines 5—5 of Fig. 4;

Fig. 6 is a vertical section taken through the axis of a chuck and associated mechanism for an internal grinding machine;

Fig. 7 is a front view of an internal grinding machine embodying the chuck shown in Fig. 6;

Fig. 8 is an end view of part of the mechanism shown in Figs. 6 and 7;

Fig. 9 is a top plan view of the mechanism of Fig. 8;

Figure 10:
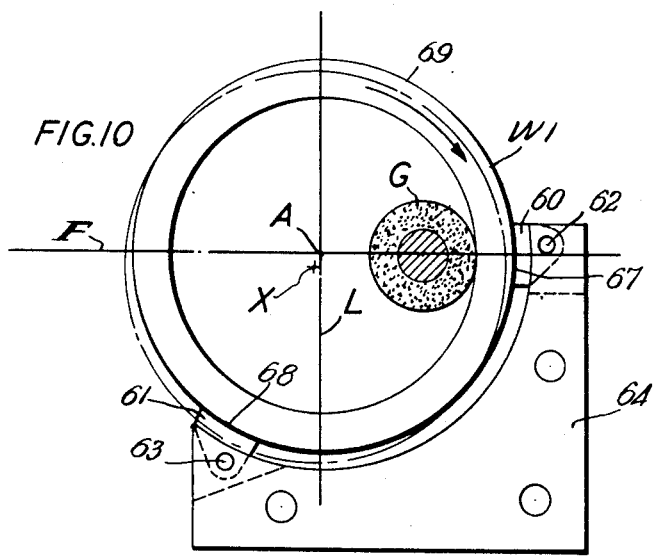
Fig. 10 is an enlarged end view of part of the mechanism of Fig. 7.

In Figs. 1–5 of the drawings is shown the electro-magnetic chuck of the invention adapted to rotate a workpiece in a surface grinder. It has a rotatable member indicated at 1 and stationary parts indicated at 2 supported on a base 3. The rotating member has a horizontal work-engaging face 10 on which a workpiece W is placed to rotate about the axis 11, which is the axis of revolution of the trunnion or shaft 13, which is mounted in suitable bearings in the base 3 and may be rotatably driven by any convenient means, not shown.

A pair of annular-shaped, concentrically arranged inner and outer stationary electro-magnetic coils 15 and 16 wound on spools 12 and 14 are supported in recesses 17 and 18 in a circular core structure 20, preferably comprising soft iron or other highly magnetizable material, providing core means forming a magnetizable stationary core for each coil. The core structure 20 has portions 22, 23 and 24 conforming with and adjacent the faces of the coil 15 and forming a stationary core piece for the coil 15, and portions 26, 27 and 28 likewise forming a stationary core piece for the coil 16.

As seen in Fig. 4, each coil has a pair of electric wire connections 30 and 31 by which it is electrically energized. When the coil 15 is energized, the core piece 22, 23 and 24 is magnetized, and, when the coil 16 is energized, the core piece 26, 27 and 28 is magnetized.

Mounted on the peripheral edge of the rotatable member 1 and therefore rotatable with it is a rotatable core piece 35 having underneath it a preferably labyrinthine configuration corresponding to a complementary configuration on the upper periphery of the stationary core piece portion 26 including a slot or recess 36 into which extends a downward projection 37 of the core piece 35 forming an air gap 40 between them having a corresponding labyrinthine configuration. These parts are arranged so that the distance across the gap 40 is short as possible still allowing the rotatable part 35 to run adjacent the stationary part 26 without touching and the clearance across the gap has been found to be conveniently of the order of five thousandths of an inch.

The gap has the labyrinthine configuration in order to provide as much surface area as possible between the adjacent parts of the stationary and rotatable core pieces in order to decrease resistance to magnetic flow and also to provide a baffle arrangement which prevents dirt and coolant liquid from entering and fouling the parts inside the chuck.

Another rotatable core portion 45 is mounted on and carried by the rotatable member 1 and arranged concentrically with the rotatable member 35. It extends from the work-engaging surface 10 downwardly into a slot or recess 46 between the inner and outer coils 15 and 16 and which divides the core portions 24 and 28, with an air gap 46, also of desirably close tolerance, between the lower part 47 of the rotatable core portion 45 and the surrounding stationary portions of the core structure 20. These parts are also formed in order to provide as much surface area as possible at the air gap between the adjacent structures.

A somewhat similar air gap 50 of substantially equivalent tolerance is also provided between the stationary core portion 22 and the rotating shaft 13, which is formed of magnetizable material and passes through the hole or recess 51 in the stationary core.

It will now be seen that the coil 15 has a magnetizable core having elements of opposite polarity extending to the work-engaging face 10 of the chuck comprising the stationary core portions 22, 23, 24 and the concentric rotatable core portions 13 and 45 carried by the rotatable member 1, the latter each adjacent a part of the stationary portion and arranged together therewith substantially to surround the coil 15 inside and out, and the stationary portion and the rotatable portions having gaps between them arranged to allow magnetic forces to pass continually between the core portions and to be exerted on a workpiece on the work-engaging face while the rotatable portions move relative to the stationary portions. Similarly, the coil 16 has a magnetizable core having elements of opposite polarity extending to the work-engaging face comprising the stationary circular portion 26, 27, 28 and the rotatable portions 35 and 45 with gaps between.

Concentrically spaced across the work-engaging face of the chuck and rotatable therewith and located between the rotating core or pole piece elements 13, 45 and 35 are arranged additional pole piece elements 55 of magnetizable material, which are spaced apart from each other and from the rotatable core pieces 13, 35 and 45 but attached thereto, that is, magnetically separated but structurally joined by concentric rings 56 of non-magnetic material, such as bronze. As best seen in Fig. 3, the sections of the magnetic elements 55 may be upwardly flared and of the non-magnetic elements 56 upwardly tapered so as to provide more concentrated and increased magnetic flux at the work-engaging face. By this structure the magnetic flux through a workpiece placed in any position on the work-engaging face is increased.

We have found that an increase in the current and in the magnetic capacity of the coils and core structure is necessary over that required for equivalent holding power in the usual form of chuck to overcome the resistance to magnetic flux created by the use of the gaps, but this is an insignificant matter compared to the desirability of eliminating slip rings for energizing the coils and which our invention provides.

Figs. 6–10, inclusive, show the adaptation of the chuck of our invention to an internal grinding machine having the general appearance of Fig. 7 as a back plate for supporting in an endwise direction and driving an annular or other similar workpiece $W^1$ whose internal surface S is being ground by a grinding wheel G or other abrading tool. As best seen in Fig. 10, the workpiece $W^1$ may be radially supported to rotate about a fixed axis A by a pair of arcuate work supports 60 and 61, which may be pivoted at 62 and 63 on a fixture 64 and which have arcuate concave surfaces 67 and 68 generally conforming to, so as to be in sliding contact with, the outer peripheral surface 69 of the workpiece $W^1$. Preferably the support shoes 60 and 61 are located to straddle a line L through the center of the workpiece normal to the line F of the force exerted by the wheel G against the work and one of the support shoes 60 may be located at least partly on the line of force F, as described in co-pending applications Serial No. 354,197 and Serial No. 368,912 and patent to Blood No. 2,646,652.

The electromagnetic chuck or back plate 70 of the invention is rotatably mounted on a shaft 3a in a conventional work head 71 to be driven by a pulley 99 and to rotate around an axis X, as seen in Fig. 10, which is eccentric to the axis A of rotation of the workpiece, so that, as the workpiece $W^1$ is held against the work-engaging face 75 of the back plate 70 by magnetic force and rotated by the back plate 70, a force is exerted upon the workpiece $W^1$ tending to urge it downward and to the right, as seen in Fig. 10, against the radial support shoes 60 and 61, which force results from frictional slippage between the back plate 70 and the workpiece, as also more particularly described in said co-pending applications and said patent.

The back plate 70 comprises a stationary portion, indicated at 72, and a rotating portion, indicated at 73, the latter including rotatable pole pieces or core portions 77 and 78 of opposite polarity concentrically arranged and extending to the work-engaging face 75. The stationary part 72 includes a stationary annular-shaped electromagnetic coil 80 to which current is fed through electric wires 81, 82. The coil 80 is enclosed in and supported by a circular stationary core structure 85 of highly magnetizable material, preferably soft iron, which in turn is supported on the work support 71 by a non-magnetic structure 88, preferably of bronze or like material. The rear end of the rotatable core piece 77 has a portion 90 adjacent a corresponding portion 91 of the stationary core structure 85 in an arrangement forming a gap 95 which has a labyrinthine configuration to provide a large surface area of the parts adjacent the gap and also to provide a baffle against the entrance of dirt and water. The rear end 96 of the rotatable core portion 78 is adjacent a rear part 97 of the stationary core structure 85, also forming a gap 98.

The rotatable core portions 77 and 78 are magnetically separated but structurally joined by a filler 100 of non-magnetic material, such as bronze. An annular shaped non-magnetic filler 102 is also provided between the rear of the core piece 78 and the end of a shaft 3a to confine the magnetic flux in the desired area and to concentrate it at the operative face 75 terminating the core portions 77 and 78.

Figure 11:
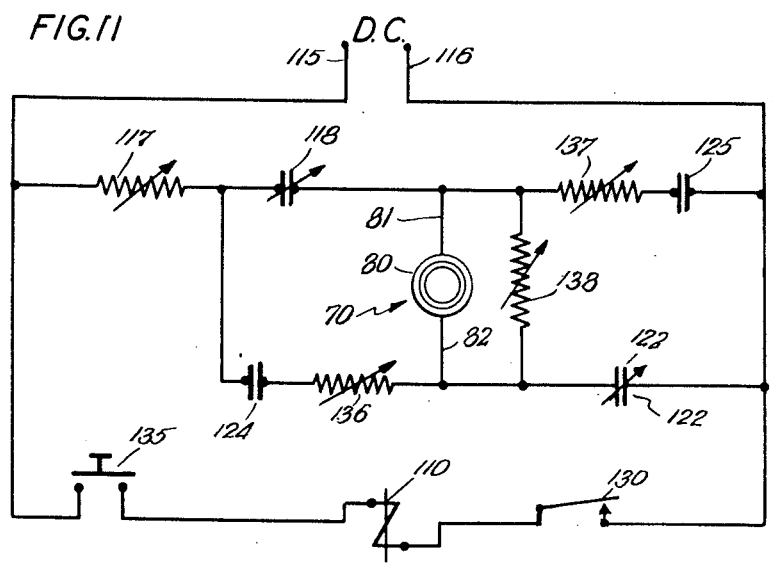
Fig. 11 is a wiring diagram of a circuit for demagnetizing the chuck.

Means shown in Fig. 11 are provided for reversing the magnetic flux in the back plate 70 to eliminate residual magnetism so that the workpiece $W^1$ may be released at the desired time, and at the same time to operate a wiper 105 which is passed across the work-engaging face 75 to remove foreign particles so as to preserve the accuracy of the face. The wiper 105 may also be conveniently combined with a work ejector 106, both being mounted on an arm 108 operated by a solenoid 110.

Referring to Fig. 11, direct current is supplied to the wires 115 and 116 and from the wire 115 through an adjustable resistance 117 and a normally closed switch 118 to the contact 81 of the coil 80, and from the wire 116 through the normally closed switch 122 to the contact 82 on the other side of the coil 80, causing current flow through the coil 80 in a predetermined direction and with a strength as adjusted by the setting of the resistance 117. The normally closed switches 118 and 122 are opened and a pair of normally open switches 124 and 125 are closed when a contactor switch 130 is energized.

As seen in Fig. 7, when the table T supporting the grinding wheel G is run out to the right to withdraw the wheel from the work, a cam C under the table closes a switch 135. In Fig. 11, when the switch 135 is closed, the contactor switch 130 is energized, opening switches 118 and 122 and closing switches 124 and 125. This causes the wire 115 which was heretofore connected to the contact 81 to be connected now to the contact 82, and likewise causes the wire 116 heretofore connected to the contact 82 to be now connected to the contact 81, respectively through adjustable resistances 136 and 137, a resistance 138 also being provided in parallel with the coil 80. The resistances are adjusted so that a smaller current flows in the reverse direction through the coil 80 while the chuck is inoperative, thereby in effect demagnetizing the operative rotatable pole pieces 77 and 78. When the switch 135 is closed, the solenoid 110 is also energized to move the wiper 105 across the face of the chuck 70 with the ejector 106.

It will be seen that many variations in design are possible in accordance with particular chucking requirements.

We claim:

1. A rotatable electro-magnetic chuck for machine tools comprising, in combination, a plurality of stationary coils, means forming a magnetizable core for each coil and a rotatable member having a work-engaging face, said core means having rotatable portions arranged to be magnetized by the coils and carried by the rotatable member and extending substantially to the work-engaging face.

2. A rotatable electro-magnetic chuck for machine tools comprising, in combination, a plurality of stationary coils, means forming a magnetizable core for each coil and a rotatable member having a work-engaging face, said core means having stationary portions arranged to be magnetized by the coils and rotatable portions carried by the rotatable member and extending substantially to the work-engaging face, the stationary portions and the rotatable portions having gaps between them arranged to allow magnetic forces to pass continually between said respective portions and to be exerted on a workpiece while the rotatable portions move relative to the stationary portions.

3. A rotatable electro-magnetic chuck for machine tools comprising, in combination, a plurality of stationary coils, means forming a magnetizable core for each coil and a rotatable member having a work-engaging face, said core means having stationary portions arranged to be magnetized by the coils and means operable as pairs of rotatable portions carried by the rotatable member, each said pair extending substantially to the work-engaging face, the stationary portions and the rotatable portions having gaps between them arranged to allow magnetic forces to pass continually between said portions and to be exerted on a workpiece while the rotatable portions move relative to the stationary portions.

4. In a rotary surface grinding machine and, in combination, a plurality of concentric horizontal stationary coils each having the general form of an annulus, a work-supporting member having a horizontal work-engaging face and which is rotatably supported to turn on the vertical axis of the coils, and a magnetizable core structure for the coils comprising a stationary circular core portion supporting the coils and generally conforming to and adjacent three faces of each coil and having concentric recesses inside and outside each coil, and a plurality of concentric circular rotatable core portions carried by the work-supporting member providing elements of opposite polarity for each coil at the work-engaging face and extending downwardly into said recesses closely adjacent said stationary core portion providing air gaps therebetween, the outside said gap having a labyrinthine configuration, said gaps being arranged to allow magnetic forces to pass continually between said portions and to be exerted on a workpiece while the rotatable portions move relative to the stationary portion.

5. In the combination as set forth in claim 4, said rotatable portions being structurally joined by alternate sections of magnetic material extending to said work-engaging face and non-magnetic material therebetween and thereby being capable of increasing the magnetic field through a workpiece in contact with said work-engaging face.

6. A rotatable electro-magnetic chuck for machine tools comprising in combination a stationary base, a spindle mounted rotatable relative to the base and having a work engaging portion, a pair of generally annularly shaped non-rotatable coils fixed concentrically one within the other on the base, a circular magnetizable element forming stationary core portions for each said coil, said element being fixed to the base on the side of the coils opposite the work engaging portion and extending radially from the inside of the inner coil to the outside of the outer coil and including portions extending axially of said spindle toward said work engaging portion inside, outside and between said coils, and said work engaging portion including circular magnetizable elements forming rotatable core portions for each said coil, said rotatable core portions extending axially of said spindle toward and into close proximity with each of said stationary core portions and forming gaps between said stationary and said corresponding rotatable core portions thereby providing a magnetic circuit between said coils and said work engaging portion.

7. A rotatable electro-magnetic chuck for machine tools comprising in combination a stationary base, a spindle mounted rotatable relative to the base and having a work engaging portion, a pair of generally annularly shaped non-rotatable coils fixed concentrically one within the other on the base, said base including a circular magnetizable element forming stationary core portions for each said coil, said core portions extending axially of said spindle toward said work engaging portion, and said spindle carrying circular magnetizable elements forming rotatable core portions for each said coil, said rotatable core portions extending axially of said spindle toward and into close proximity with each of said stationary core portions and forming gaps between said stationary and said corresponding rotatable core portions thereby providing a magnetic circuit between said coils and said work engaging portion.

8. A rotatable magnetic chuck for machine tools comprising in combination a stationary base, a spindle mounted rotatable relative to said base and having a work engaging portion, a pair of generally annularly shaped non-rotatable coils fixed concentrically one within the other on the base, said base including a circular magnetizable element fixed to the base, said magnetizable element being circularly recessed to receive and support said coils and forming stationary core portions for each said coil, and said spindle carrying a plurality of circular radially spaced magnetizable elements forming rotatable core portions for each said coil, the stationary and the rotatable core portions being arranged in close proximity to each other radially inwardly and outwardly of each said coil forming gaps therebetween thereby providing a magnetic circuit between said coils and said work engaging portion.

9. An electro-magnetic chuck to engage the end of a round workpiece for using in a grinding machine for grinding surfaces of revolution of round workpieces comprising in combination a stationary head, a spindle rotatably mounted in the head, a circular housing formed of magnetizable material fixed to the head, an annularly shaped coil enclosed within and supported by said housing concentrically with the spindle axis, said housing forming a stationary core portion for the coil, said spindle carrying a pair of concentric elements formed of magnetizable material and magnetically separated from the spindle body providing a pair of rotatable core portions for the coil each in close proximity to a portion of said stationary housing on opposite sides of said coil forming gaps therebetween and having portions whose inner and outer surfaces are circular in cross section and generally tapering in longitudinal section and extending axially one inside the other and converging toward each other to a plane normal to the spindle axis thus forming a circular work engaging face, the said two rotatable core portions being magnetically separated from each other.

10. An electro-magnetic chuck to engage the end of a round workpiece for use in a grinding machine for grinding surfaces of revolution of round workpieces comprising in combination a stationary head, a hollow spindle rotatably mounted in the head, a circular housing formed of magnetizable material fixed to the head, an annularly shaped coil enclosed within and supported by said housing concentrically with the spindle axis, said housing forming a stationary core portion for the coil, said spindle carrying a pair of hollow concentric elements formed of magnetizable material and magnetically separated from the spindle body providing a pair of rotatable core portions for the coil each in close proximity to a portion of said stationary housing on opposite sides of said coil forming air gaps therebetween and having portions whose inner and outer surfaces are circular in section extending axially one inside the other to a plane normal to the spindle axis thus forming a hollow circular work engaging face, the said two rotatable core portions being magnetically separated from each other, and the outer diameter of the outer said core portion at the work engaging face being smaller than the outer diameter of the coil.

11. The combination as set forth in claim 10 in which the maximum diameter of the outer said core portion is smaller than the minimum diameter of the coil.

12. The combination as set forth in claim 10 including a plug gage supported axially slidably within said spindle and capable of extension beyond said work engaging face for gaging a workpiece in contact therewith.

13. An electro-magnetic chuck to engage the end of a round workpiece for use in a grinding machine for grinding surfaces of revolution of round workpieces comprising in combination a stationary head, a spindle rotatably mounted in the head and having a flange on one end thereof, a circular non-magnetic separator element attached to the flange, a circular housing formed of magnetizable material fixed to the head, an annularly shaped coil enclosed within and supported by said housing concentrically with the spindle axis, said housing forming a stationary core portion for the coil, a pair of concentric elements formed of magnetizable material providing rotatable core portions for the coil, the inner said concentric element being attached to said separator, non-magnetic separator means supporting the outer said element on the inner said element, said rotatable core portion elements each being in close proximity to a portion of said stationary housing on opposite sides of said coil forming air gaps therebetween and having portions whose inner and outer surfaces are circular in cross section extending axially one inside the other to a plane normal to the spindle axis thereby providing a circular work engaging face.

14. In the combination as set forth in claim 13, the said inner said concentric element having a flange by which it is attached to said separator, said flange having a diameter greater than the diameter of the coil and being in said close proximity with said housing and forming a said air gap adjacent the outer periphery of its said flange.

15. In the combination as set forth in claim 13, the maximum diameter of the outer of said rotatable core portions being smaller than the minimum diameter of said coil.

16. In the combination as set forth in claim 13, the maximum diameter of said work engaging face being smaller than the maximum diameter of said coil.

17. In the combination as set forth in claim 13, said spindle and its said flange, said separator element and the inner of said rotatable core portion elements all being hollow along the axis of the spindle, and a gage rod axially slidably supported on the spindle axis, said gage rod being capable of extension beyond said work engaging face.

References Cited in the file of this patent

UNITED STATES PATENTS

| | | |
|---|---|---|
| 1,544,695 | Spencer | July 7, 1925 |
| 1,568,024 | Spencer | Dec. 29, 1925 |
| 1,754,587 | Weydell | Apr. 15, 1930 |
| 2,478,607 | Theler et al. | Aug. 9, 1949 |